(12) United States Patent
Murthy (10) Patent No.: US 7,675,928 B2
(45) Date of Patent: Mar. 9, 2010

(54) INCREASING CACHE HITS IN NETWORK PROCESSORS USING FLOW-BASED PACKET ASSIGNMENT TO COMPUTE ENGINES

(75) Inventor: Krishna J. Murthy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1080 days.

(21) Appl. No.: 11/314,853

(22) Filed: Dec. 21, 2005

(65) Prior Publication Data

US 2007/0140122 A1 Jun. 21, 2007

(30) Foreign Application Priority Data

Dec. 15, 2005 (IN) .................. 3370/DEL/2005

(51) Int. Cl.
*H04L 12/28* (2006.01)
(52) U.S. Cl. .................. 370/412; 370/230; 709/231
(58) Field of Classification Search ......... 370/229–235, 370/252, 412; 709/230–238, 246
See application file for complete search history.

(56) References Cited

U.S. PATENT DOCUMENTS

| 2002/0176402 | A1* | 11/2002 | Karim ..................... 370/352 |
| 2004/0006633 | A1* | 1/2004 | Chandra et al. ............. 709/231 |
| 2004/0032872 | A1* | 2/2004 | Dhara ........................ 370/401 |
| 2004/0148391 | A1* | 7/2004 | Lake et al. .................. 709/224 |
| 2004/0246980 | A1* | 12/2004 | Balakrishnan ............... 370/412 |
| 2005/0047415 | A1* | 3/2005 | Channegowda et al. .. 370/395.4 |
| 2005/0249128 | A1* | 11/2005 | Mekkittikul et al. ........ 370/252 |

* cited by examiner

*Primary Examiner*—Ricky Ngo
*Assistant Examiner*—Kan Yuen
(74) *Attorney, Agent, or Firm*—Blakely, Sokoloff, Taylor & Zafman LLP (57) ABSTRACT

Methods and apparatus for improving cache hits in network processors using flow-based packet assignment to compute engines. Packet processing operations are performed on a network processor having multiple compute engines via execution of instruction threads on those compute engines. Via execution of the threads, a flow-based packet processing assignment mechanism is implemented that causes at least a portion of the packet processing operations for packets associated with common flows to be performed on compute engines assigned to perform packet processing operations for those flows. This results in the same compute engines performing packet processing on packets assigned to common sets of flows, thus increasing the cache hits on data that is stored locally on the compute engines pertaining to the flows.

11 Claims, 7 Drawing Sheets

INCREASING CACHE HITS IN NETWORK PROCESSORS USING FLOW-BASED PACKET ASSIGNMENT TO COMPUTE ENGINES

FIELD OF THE INVENTION

This application claims priority under the Paris Convention to foreign patent application No. 3370/DEL/2005, filed on Dec. 15, 2005, with the Patent Office Delhi in New Delhi, India.

BACKGROUND INFORMATION

Network devices, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Modern network processors (also commonly referred to as network processor units (NPUs)) perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to switch fabrics, cryptographic processors, hash units, general-purpose processors, and expansion buses, such as the PCI (peripheral component interconnect) and PCI Express bus.

Network processors are often configured to perform processing in a collaborative manner, such as via a pipelined processing scheme. Typically, different threads perform different portions of the same task or related tasks, with the output of one thread being employed as an input to the next thread. The threads are specifically tailored for a particular task or set of tasks, such as packet forwarding, packet classification, etc. This type of scheme enables packet-processing operations to be carried out at line rates for most packets, also referred to as "fast path" operations.

In general, the foregoing packet processing operations require multiple memory accesses to one or more memory units. As a result, packet throughput is inherently related to memory (access) latencies. Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory on an NPU (e.g., shared scratch memory and memory and caches local to each compute engine) is typically very small.

The next fastest type of memory is off-chip SRAM. Since this memory is off-chip, it requires a special interface (e.g., bus) to access it, adding a level of latency to the memory access. However, it still has relatively-low latency.

Typically, various types of off-chip dynamic RAM (DRAM) are employed for use as "bulk" memory units. Dynamic RAM is slower than static RAM (due to physical differences in the design and operation of DRAM and SRAM cells), and must be refreshed every few clock cycles, taking up additional overhead. As before, since it is off-chip, it also requires a special bus to access it. In most of today's network processor designs, DRAM memory stores with enhanced performance are employed, including RDRAM (Rambus DRAM) or DDR DRAM (double data rate), RLDRAM (reduced latency RAM) etc. via dedicated signals. As used herein, a memory unit comprises one or more memory storage devices having associated memory spaces.

An application designer faces the challenging task of utilizing the memory units available to an NPU in such a fashion as to ensure that a minimum amount of latency is incurred during packet processing operations, in order to maximize the packet throughput. Currently, memory unit utilization is done on a trial and error or educated guess basis in consideration of projected traffic patterns and service levels to be provided by the network element in which one or more NPU's are installed. This produces inefficient memory utilization, reducing packet throughput. Also when the designers use faster cache memories such as CAMs (Content Addressable Memories) and TCAMs (Temiary Content Addressable Memories) etc. to enhance packet processing, they are not sure of or can't quantify the lookup hit/miss rate success in the CAM/TCAM or any type of cached faster memories for a given set of packet flows arriving at the NPU.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for improving cache hits in network processors using flow-based packet assignment to compute engines are described herein. In the following description, numerous specific details are set forth, such as exemplary embodiments employing Intel's IXP 2xxx network processor architecture, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following detailed description, techniques for improving memory cache utilization while reducing memory accesses in connection with packet processing operations are disclosed. In order to better appreciate advantages provided by the techniques, a discussion of packet processing operations and network processor aspects tailored for such packet processing operations is first presented. Details of exemplary embodiments for implementing the techniques are then discussed.

Network processing requires extremely high speed update of state sequentially and coherently, while demanding exclusivity and atomicity. Intel's architecture solution to this classic problem is pipelining. The idea behind pipelining is to break the entire processing for each cell/packet into sequential stages. As long as the dependencies and ordering of these stages are maintained, the execution of the stages that correspond to many cells/packets can be performed in parallel using multiple processing elements. Moreover, each processing element can execute multiple threads in a time-shared manner in order to maximize the overall processing throughput. Network processing applications normally include multiple functions. For instance, a typical router application consists of the following functions: packet receive, route table look-up, packet classification, metering, congestion avoidance, transmit scheduling, and packet transmit. Each of these functions can be implemented as a pipeline or a pipeline stage. These pipelines connect together to form the entire application.

There are two basic pipelining approaches: context pipelining and functional pipelining. A context pipeline is comprised of processing stages that each performs a specific function. The context of a cell/packet moves from stage to stage as the individual functions are sequentially performed on the context. Each context pipeline stage is represented by a processing element. If the processing element supports multi-threading with up to n threads, the processing element can apply the specific function to n contexts of cells/packets during one stage. As a result, the time budget for a stage can be n times the cell/packet arrival rate. In other words, one can afford to have n times the cell/packet arrival rate as time budget to perform only one function, which is just a portion of the entire processing. Another advantage of context pipelining is that each processing element only needs to perform its own function; consequently, the complexity and amount of software required for a processing element is minimized to the support of that particular function.

Figure 1A:
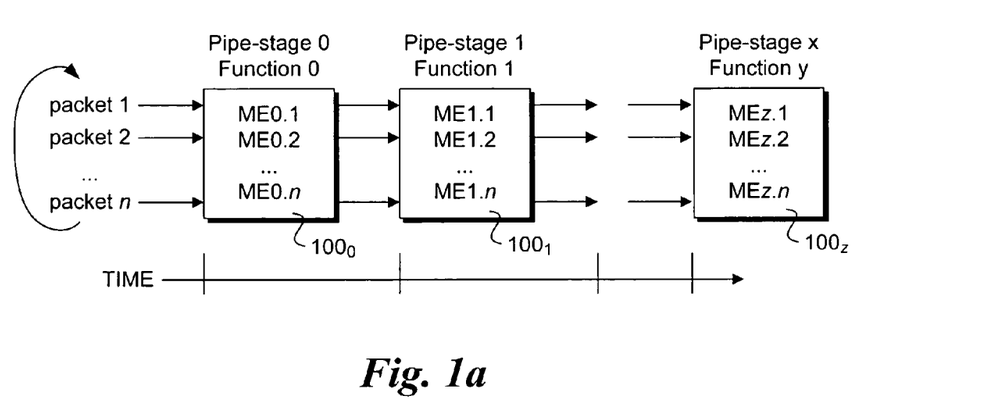
FIG. 1a is a schematic diagram illustrating a technique for processing multiple functions via multiple compute engines using a context pipeline.

In a context pipeline, different functions are performed on different microengines (MEs) as time progresses, and the packet context is passed between the functions or MEs, as shown in FIG. 1a. Under the illustrated configuration, z MEs $100_{0-z}$ are used for packet processing operations, with each ME running n threads. Each ME constitutes a context pipe stage corresponding to a respective function executed by that ME. Cascading two or more context pipe stages constitutes a context pipeline. The name context pipeline is derived from the observation that it is the context that moves through the pipeline.

Under a context pipeline, each thread in an ME is assigned a packet, and each thread performs the same function but on different packets. As packets arrive, they are assigned to the ME threads in strict order. For example, there are eight threads typically assigned in an Intel IXP2800® ME context pipe stage. Each of the eight packets assigned to the eight threads must complete its first pipe stage within the arrival rate of all eight packets. Under the nomenclature illustrated in FIG. 1, MEi.j, i corresponds to the ith ME number, while j corresponds to the jth thread running on the ith ME.

In functional pipelining, a single processing element performs different functions during different stages, on the same cell/packet context. Consider a processing element that performs m consecutive functions on a cell/packet context; during each stage, a processing element only performs one of the m functions. This processing element takes m stages to complete its processing on each cell/packet context. In order to avoid blocking the overall pipeline advancement as new cells/packets arrive, m processing elements work in parallel. These m processing elements form the functional pipeline. These m processing elements actually work in a staggered fashion, so that at any one stage in time, each processing element performs a different function out of the m functions. This staggering is needed because each function may demand exclusive ownership of some global state. In case each processing element supports n threads of multi-threading, it can process n different cell/packet contexts in a time-shared manner in each stage. The advantage of functional pipelining is that the time budget each processing element has for operating on a cell/packet context is m×n×the cell/packet arrival rate. This time budget is m times bigger than the time budget that a context pipeline offers. In other words, functional pipelining accommodates very long latency functions efficiently. The disadvantages of functional pipelining include the overhead for transferring state information between consecutive processing elements, and the relatively greater complexity or larger amount of software required in each processing element; each needs to perform m functions as opposed to one function for a context pipeline stage.

Figure 1B:
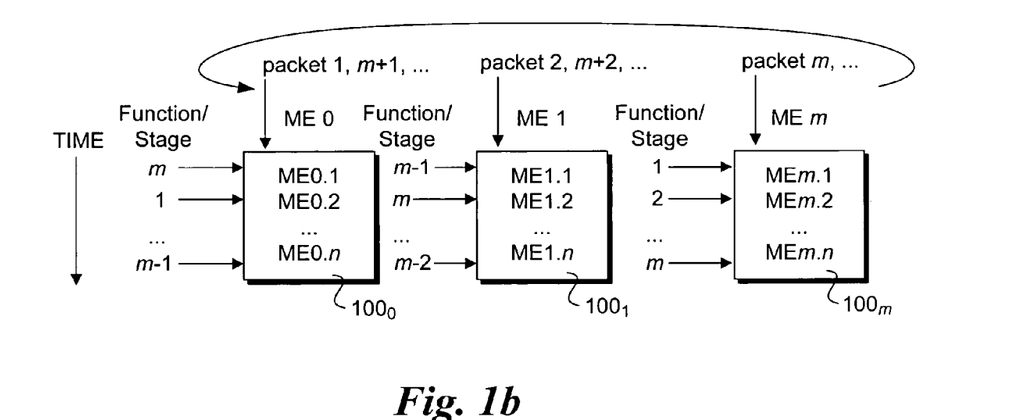
FIG. 1b is a schematic diagram illustrating a technique for processing multiple functions via multiple compute engines using function pipelining.

An example of a functional pipeline is illustrated in FIG. 1b. Under the illustrated approach, m processing functions are performed on each of m MEs $100_{0-m}$ in a staggered manner, such that at a given point in time (stage), each ME is performing a different function from among the m functions. Furthermore, each ME is depicted as employing a corresponding thread from among n threads for each function.

Figure 2:
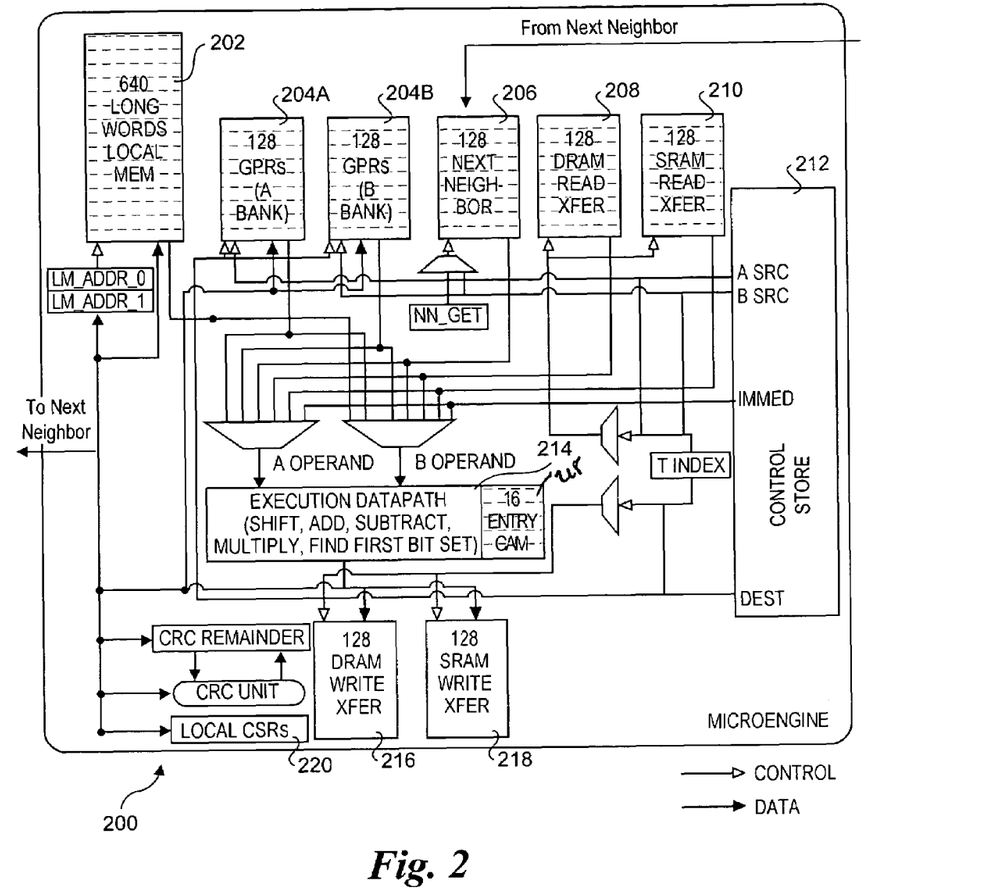
FIG. 2 is a schematic diagram of a microengine architecture.

A block diagram corresponding to one embodiment of a microengine architecture 200 is shown in FIG. 2. Architecture 200 depicts several components typical of compute-engine architectures, including local memory 202, general-purpose register banks 204A and 204B, a next neighbor register 206, a DRAM read transfer (xfer) register 208, an SRAM read transfer register 210, a control store 212, execution datapath 214, a DRAM write transfer register 216, and a SRAM write transfer register 218.

Architecture 200 support n hardware contexts. For example, in one embodiment n=8, while in other embodiments n=16 and n=4. Each hardware context has its own register set, program counter (PC), condition codes, and context specific local control and status registers (CSRs) 220. Unlike software-based contexts common to modem multi-threaded operating systems that employ a single set of registers that are shared among multiple threads using software-based context swapping, providing a copy of context parameters per context (thread) eliminates the need to move context specific information to or from shared memory and registers to perform a context swap. Fast context swapping allows a thread to do computation while other threads wait for input/output (IO) resources (typically external memory accesses) to complete or for a signal from another thread or hardware unit.

Under the embodiment illustrated in FIG. 2, the instructions for each of the threads are stored in control store 212. However, this does not imply that each thread executes the same instructions and thus performs identical tasks. Rather, the instructions are typically structured to perform multiple tasks. Generally, execution of the multiple tasks are structured to support multi-threaded processing techniques, wherein a given set of tasks are performed on a respective object being handled by a network processor that includes multiple microengines, such as packet-forwarding operations. For example, in one embodiment the set of tasks performed by a given microengine correspond to a sub-set of overall tasks performed by a layer-2 application (e.g., one thread manages data movement from memory, another does header processing, etc.) As discussed above, a particular set of tasks may be performed by threads running on one or more microengines in a cooperative manner.

The following embodiments leverage aspects of the functional pipeline processing techniques and characteristics of packet flows in view of modern NPU architectures to improve the cached data hit rate in memories local to the NPU compute engines. This reduces the number of memory accesses that are performed during packet processing operations, and thus reduces packet processing latency.

In accordance with aspects of some embodiments, two software based components are added to a conventional NPU toolkit to effect the improved cache hit rate techniques. These include a (Data plane) Packet Classifier and Metadata De-multiplexer (PCMD), and a control plane PCMD initialization module.

The PCMD is used to perform two primary operations: Packet (flow) Classification and assignment of packets to functional pipelines by producing the packets on scratch rings associated with the flows to which the packets are classified. Meanwhile, the PCMD initialization module is used to initialize various data structures to effect various tasks associated with PCMD run-time operations.

Figure 3:
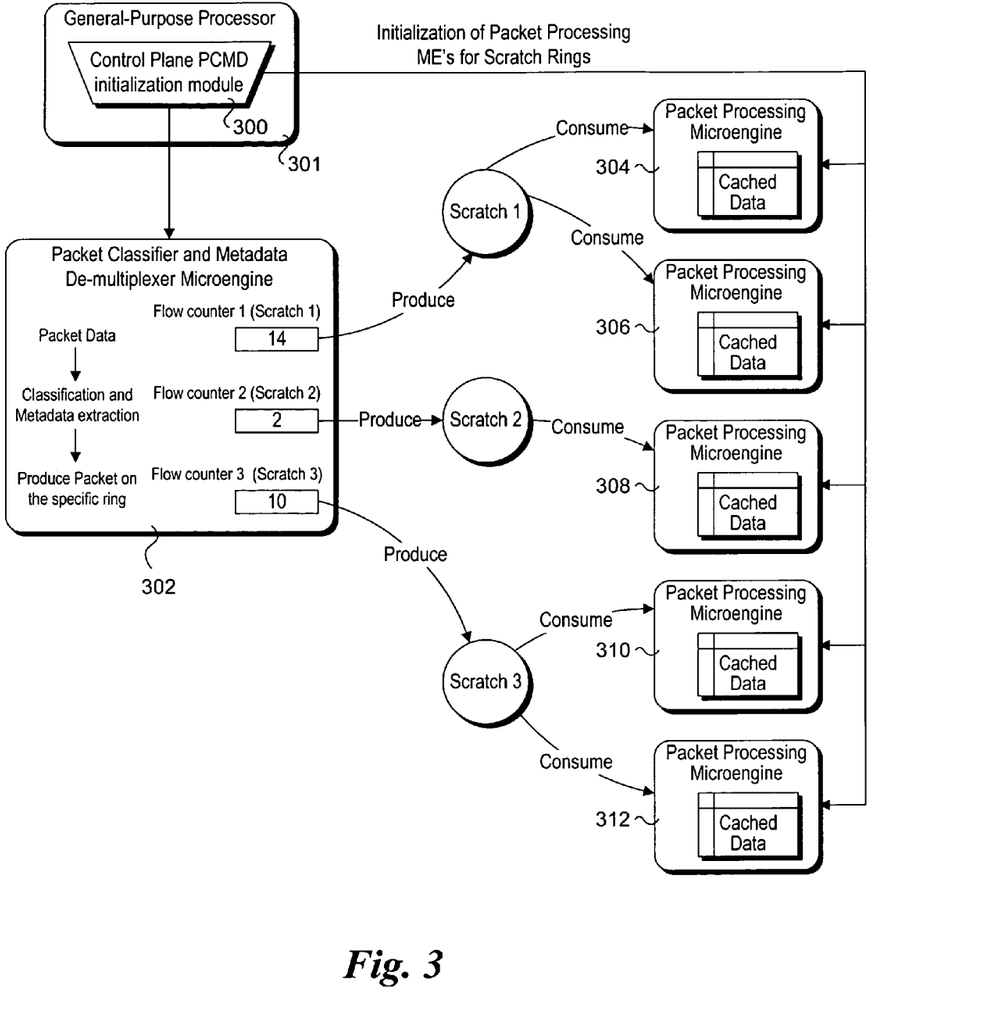
FIG. 3 is schematic diagram illustrating operations relating to a Packet Classifier and Metadata De-multiplexer (PCMD) module and a control plane PCMD initialization module.

FIG. 3 shows an overview of operations performed by the PCMD and the control plane PCMD initialization module. More particularly, FIG. 3 shows a control plane PCMD initialization module 300 running on a general-purpose processor 301, a PCMD microengine 302, scratch rings 1, 2, and 3, and packet processing microengines 304, 206, 308, 310, and 312. PCMD microengine 302 runs the PCMD software to effect the PCMD operations, which includes classification of packets into corresponding flows and extraction of packet metadata, as depicted toward the left side of PCMD microengine 302. Meanwhile, each flow is associated with a corresponding scratch ring. In the illustrated example, there are only three scratch rings 1, 2, and 3 for simplicity. In general, the number of scratch rings created may depend on the type of NPU application (core router/edge router/gateways etc. or on the expected number of packet/cell flows being terminated by the NPU application). Also, the number of scratch ring created can be made static by application compile time options or dynamic by load statistics collection]. In an actual implementation, n number of scratch rings could be employed. Each scratch ring, in turn, is associated with one or more packet processing microengines. In the illustrated example, scratch ring 1 is associated with packet processing microengines 304 and 306, while scratch ring 2 is associated with packet processing microengine 308 and scratch ring 3 is associated with packet processing microengine 310 and 312. The association between scratch rings and microengines is effected by binding microengines to scratch rings during compile time.

Each of scratch rings 1, 2, and 3 comprises a circular First-In-First-Out (FIFO) data structure in memory referred to as "scratchpad RAM" that is provided as on-chip SRAM memory on the host NPU. Accordingly, scratch rings are also called scratchpad rings. The are two operations performed with a scratch ring: producing and consuming. Producing concerns data being added to a scratch ring, while consuming concerns data being removed from a scratch ring. A pair of ring pointers are used to identify the current production buffer (that is, the next available buffer to which new data is to be added) and the current consumption buffer (that is, the buffer that is next in line from which data is to be removed. Generally, the rates at which data is produced and consumed need not be identical; however, a task that produces data faster than a corresponding task consumes data for a given ring will cause the ring buffers to become full.

Scratch ring implementations afford design flexibility with regard to production and consumption paths. For example, multiple producing tasks can be coupled to a single consuming tasks. Similarly, a single scratch ring may "feed" multiple consuming tasks. This latter case is illustrated in FIG. 3, wherein each of scratch rings 1 and 3 feed two packet processing microengines.

In accordance with the metadata de-multiplexer aspect of PCMD microengine 302, packet flows are associated with specific scratch rings, such that the same packet processing microengine or microengines perform packet processing on packets corresponding to the same set of flows. Packet flows relate to packets that are classified (also referred to as assigned) to a common group of packets with similar characteristics. For example, packets that are destined for the same destination address or destination prefix may be classified to the same flow. Similarly, packets that have multiple common classification attributes, such as source and destination address, source and destination ports, etc., may be classified to the same flow. Since packets classified to a common flow have common attributes, the packet processing operations (subsequent to packet classification) are typically the same. Thus, it is advantageous to provide those packets to the same packet processing microengine(s) in architectures that employ functional pipelines, as will be made more clear below.

Along with providing a mechanism for providing packets to appropriate packet processing microengines, the PCMD microengine provides a mechanism for tracking the number of flows allocated to each scratch ring. This is provided through use of a respective flow counter for each scratch ring, as depicted flow counters 1, 2, and 3. In general, the flow counters may be maintained in an appropriate storage resource local to a microengine, such as a general purpose register or local memory (e.g., local memory 202 for the microengine architecture of FIG. 2).

The control plane PCMD initialization module 300 is used for initializing the PCMD microengine 302 and packet processing engines 304, 306, 308, 310, and 312 with appropriate data to set up for subsequent run-time operations. With reference to the flowchart of FIG. 4, the following operations are performed during one embodiment of the initialization process. First, in a block 400, memory for the scratch rings are allocated. As described below in further detail, some NPUs include on-chip scratchpad memory or the like that may be used for this purpose. Other types of memory resources may also be used. The number and size of the scratch rings is a compile time option (or may be runtime if the PCMD ME is made intelligent by load statistics collection) that may be configured based on the expected traffic pattern at the network element in which the application is to be implemented. For example, the traffic conditions expected at some network elements may result in many different classified flows, while the number of flows at other locations will be less. Further details of the scratch ring operations are discussed below with reference to FIG. 5.

Figure 4:
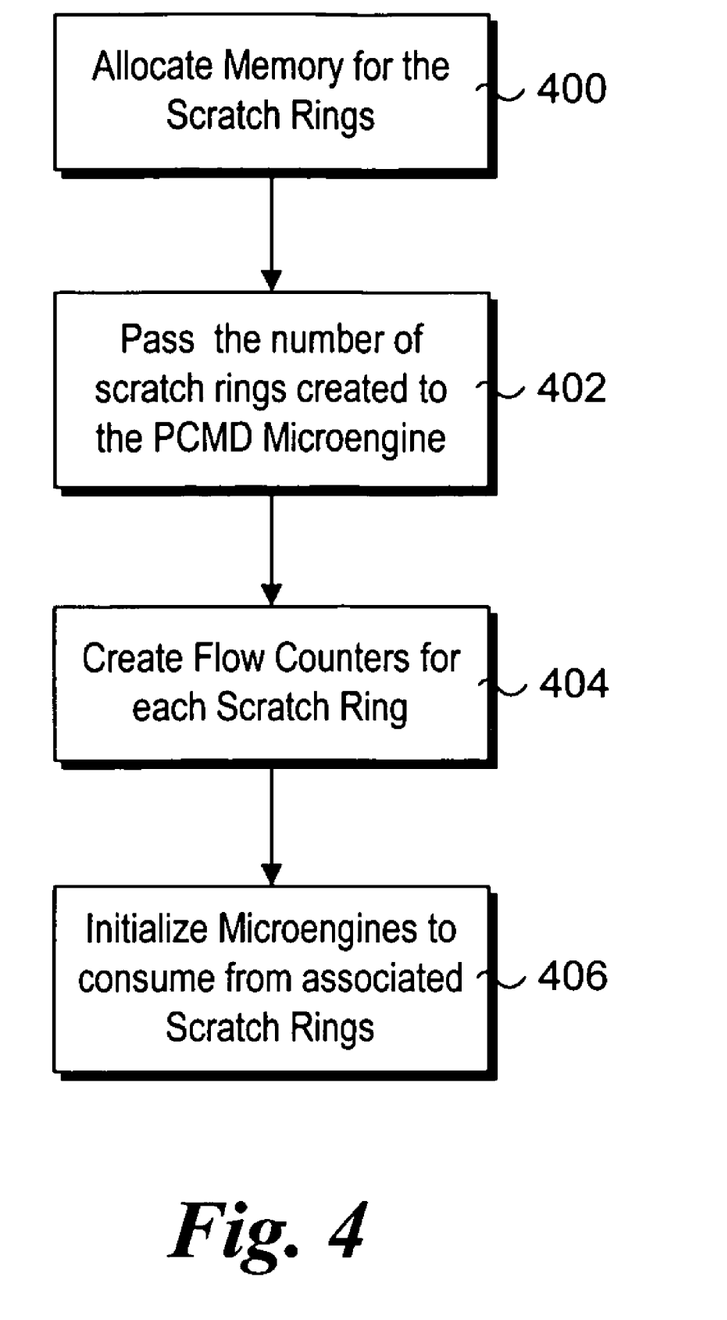
FIG. 4 is a flowchart illustrating initialization operations performed by the control plane PCMD initialization module of FIG. 3.

In conjunction with allocating memory for the scratch rings, the control plane PCMD initialization module passes the number of scratch rings created to the PCMD microengine 302 in a block 402. The PCMD microengine then creates flow counters for those scratch rings in a block 404. For example, a portion of local memory 202 for an IXP 2xxx microengine is allocated for m flow counters in one embodiment. In another embodiment, general-purpose registers 204A and/or 204B are used. The number and size of the flow counters is also a configurable compile time option. Alternately, new flow counters may be dynamically allocated for dynamically allocated scratch rings.

Continuing at a block 406, the packet processing microengines are initialized to associate each microengine with its corresponding scratch ring. This informs each microengine of the location in scratchpad memory of the scratch ring from which that microengine will consume packets (actually, packet metadata is stored in the scratch rings rather than the packets themselves, but is conventional practice to say that "packets" are produced on scratch rings and consumed from scratch rings.)

Figure 5:
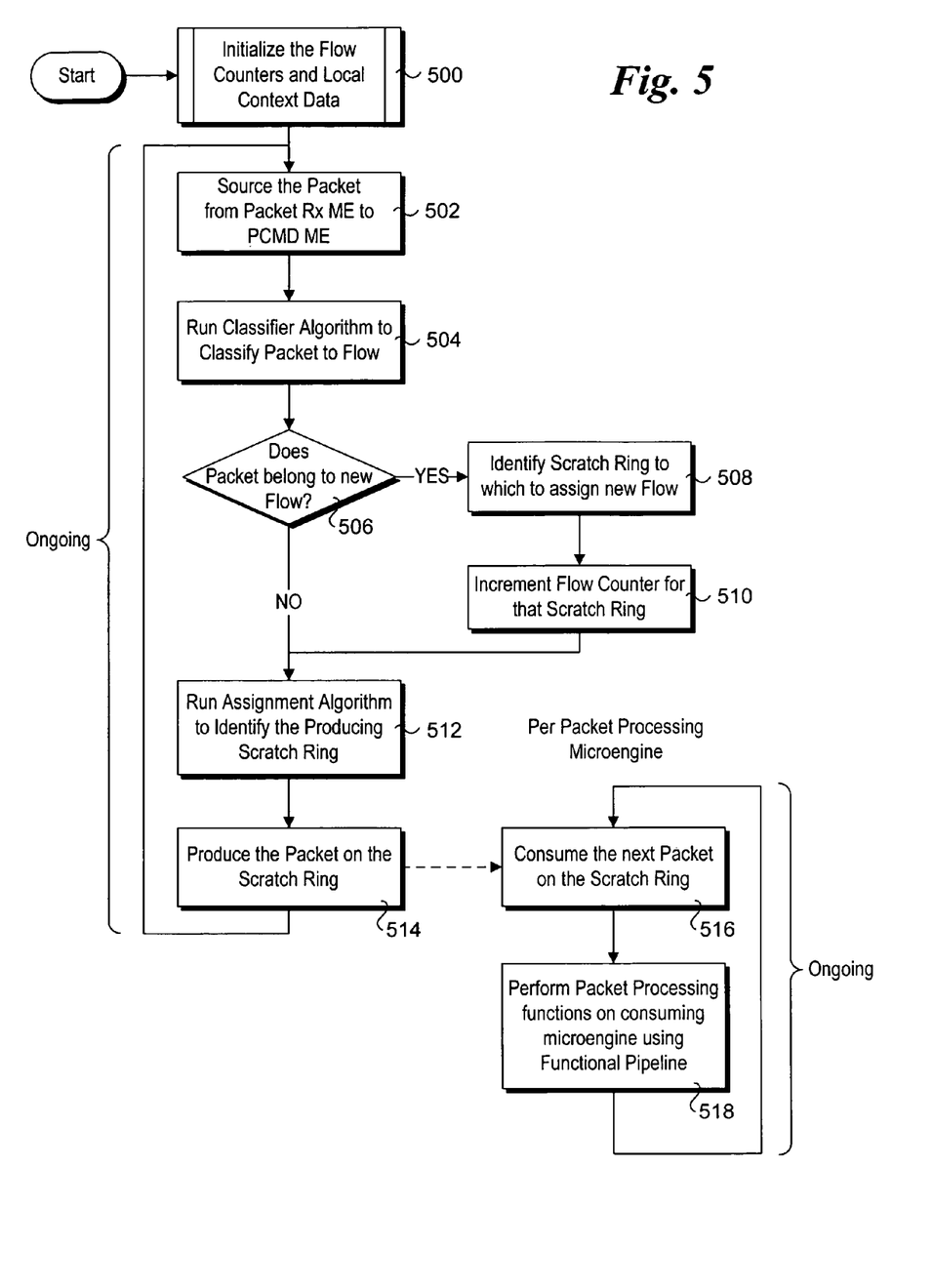
FIG. 5 is a flowchart illustrating an overview of packet processing operation performed during ongoing run-time operation of a network element.

FIG. 5 depicts an overview of packet processing operations performed during continuing run-time operation of a network element. First, in a block 500, the flow counters and local context data are initialized. The run-time operations begin in a block 502, wherein a packet is "sourced" from a packet receive microengine to the PCMD microengine. The PCMD microengine then performs packet classification using an associated algorithm (or multiple algorithms, depending on the classification scheme) to classify the packet to a flow in a block 504.

In a decision block 506, a determination is made to whether the packet belongs to a new flow. If it does, packets corresponding to the new flow are assigned to a scratch ring in a block 508, and the flow counter for that scratch ring is incremented in a block 510 to reflect the addition of the new flow to the scratch ring.

Continuing at a block 512, based on the classified flow, an assignment algorithm is run to identify the scratch ring to which the flow is assigned. The packet (e.g., the packet handle along with metadata) is then produced on that scratch ring in a block 514.

During the ongoing operations of blocks 502, 504, 506, 508, 510, 512 and 514, operations depicted in blocks 516 and 518 are likewise performed in an ongoing manner for each packet processing microengine. In block 516, a microengine associated with a given scratch ring consumes the next packet on the scratch ring based on the current position of the consuming pointer for the scratch ring. The consuming microengine then performs remaining packet processing functions using a functional pipeline in block 518.

As discussed above, the embodiments described herein improve memory cache utilization while reducing memory accesses in connection with packet processing operations. In particular, known and required flows are converged to associated packet processing MEs to achieve this result. To more clearly understand how the result is achieved, an exemplary implementation is now described with reference to an execution environment 600 shown in FIG. 6.

Figure 6:
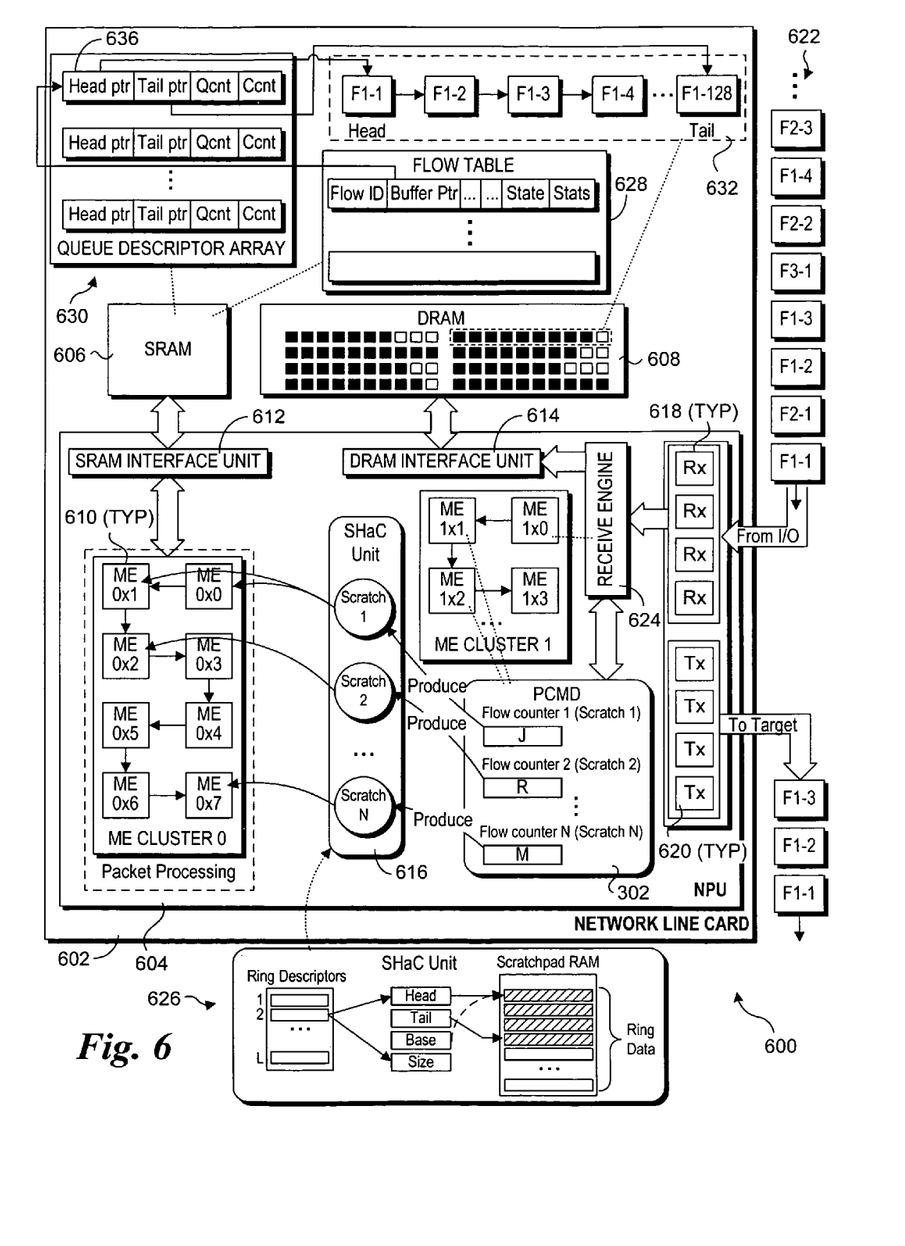
FIG. 6 is a schematic diagram of an exemplary network line card on which aspects of the embodiments discussed herein may be implemented.
Figure 7:
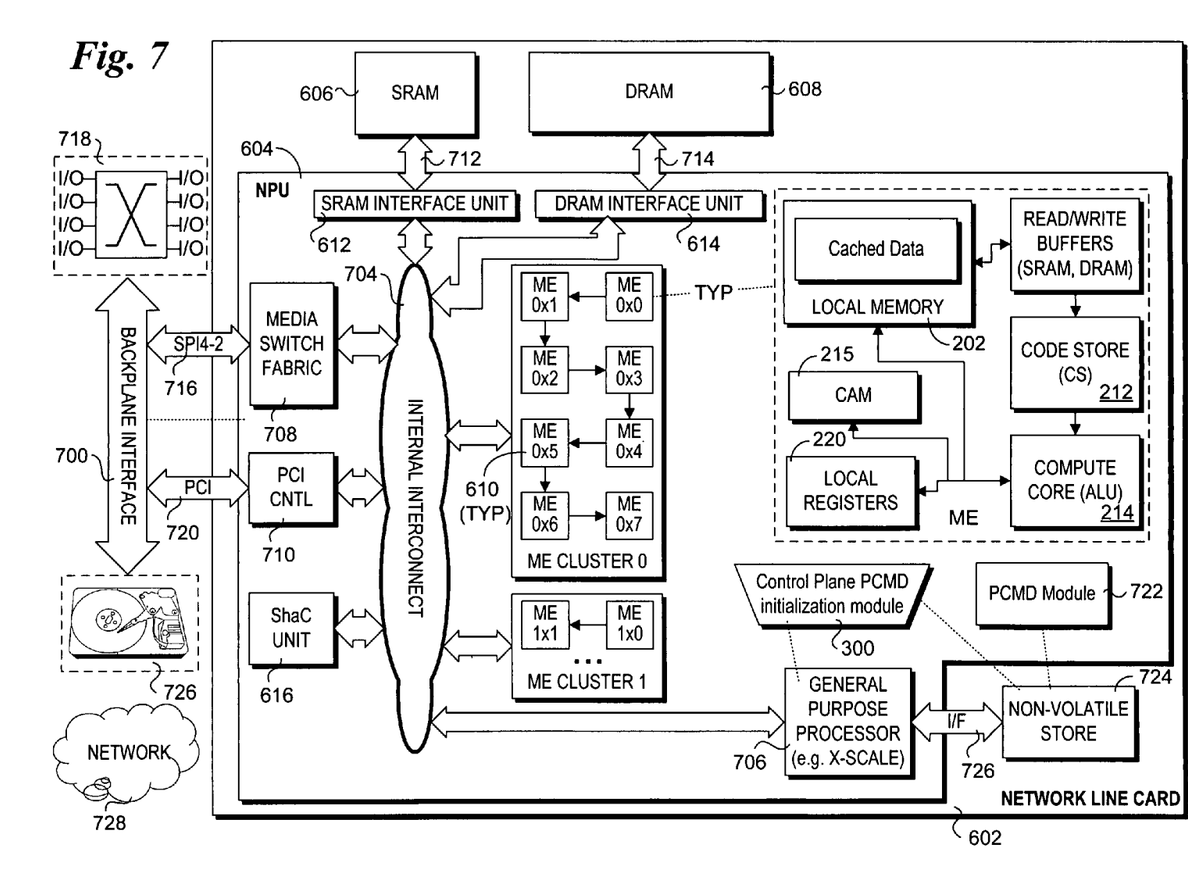
FIG. 7 shows further details of the network line card and NPU of FIG. 6.

Execution environment 600 includes a line card 602 hosting an NPU 604, SRAM 606, and DRAM 608. Further details of the NPU architecture, as well as line card 602 are shown in FIG. 7 and described below. In the illustrated embodiment, selective elements of an Intel IXP 2xxx NPU are depicted for NPU 604. These include two microengine clusters 0 and 1, each including eight microengines 610 (ME cluster 1 only shows four MEs for simplicity). Each microengine is operatively-coupled to an SRAM interface unit 612 and DRAM interface unit 614 through sets of address and data bus lines referred to as the processor "chassis." NPU 604 further includes a SHaC (Scratchpad, Hash, and CSR Access Proxy (CAP)) unit 616 and sets of inpuvoutput (I/O) buffers including multiple receive (Rx) buffers 618 (also referred to as RBUF elements) and transmit buffers 620 (also referred to as TBUF elements).

During ongoing operations, incoming packets corresponding to a packet stream 622 are received at one or more I/O ports of line card 602 and temporarily buffered in RX buffers 618. A receive engine 624 facilitated via execution of corresponding software on one or more microengines (depicted as ME 1×0 in FIG. 6) is used to manage the RBUF elements and initial packet transfer operations, which include copying packets from the RBUF elements to the PCMD microengine (s) 302. In FIG. 6, the PCMD microengines are MEs 1×1 and 1×2. In general, one or more ME's can be employed for hosting the PCMD software component. Furthermore, the PCMD operations described herein may be partitioned among multiple ME's such that different operations are performed in separate MEs. For example, better PCMD performance is achieved in one embodiment by hosting PCMD software on more than one ME as a functional pipeline.

One of the operations performed by the PCMD microengine(s) is packet classification, wherein a packet is classified to a flow. The complexity of the flow classification will generally depend on the particular requirements of the network element implementation. Overall, the objective of packet classification is to assign packets to flows having similar attributes. Subsequent packet-processing operations that may be particular to those flows may then be performed in an efficient manner.

In general, the embodiments for increasing cache hits during packet processing operations described herein are independent of the particular scheme used to classify packets into flows. However, the following discussion of packet classification is provided so one can better appreciate the advantages of packet classification as pertains to packet processing, and better understand advantages of the embodiments.

Traditional routers, which are commonly referred to as Layer-3 Switches, perform two major tasks in forwarding a packet: looking up the packet's destination address in the route database (also referred to as the route or forwarding table), and switching the packet from an incoming link to one of the router's outgoing links. Thus, flow classification under a layer-3 switch merely involves classifying the packet to a flow assigned to an outgoing link.

Increasingly, however, users are demanding, and some vendors are providing a more discriminating form of router forwarding. This new vision of forwarding is called Layer-4 Forwarding because routing decisions can be based on headers available at Layer 4 or higher in the OSI architecture. Layer 4 forwarding is performed by packet classification routers (also referred to as Layer 4 Switches), which support "service differentiation." This enables the router to provide enhanced functionality, such as blocking traffic from a malicious site, reserving bandwidth for traffic between company sites, and provide preferential treatment to one kind of traffic (e.g., online database transactions) over other kinds of traffic (e.g., Web browsing). In contrast, traditional routers (e.g., layer-3 switched) do not provide service differentiation because they treat all traffic going to a particular address in the same way.

In packet classification routers, the route and resources allocated to a packet are determined by the destination address as well as other header fields of the packet such as the source address and TCP/UDP port numbers. Layer-4 switching unifies the forwarding functions required by firewalls, resource reservations, QoS (Quality of Service) routing, unicast routing, and multicast routing into a single unified framework. In this framework, forwarding database of a router consists of a potentially large number of filters on key header fields. A given packet header can match multiple filters; accordingly, each filter is given a cost, and the packet is forwarded using the least cost matching filter.

Traditionally, the rules for classifying a message (i.e., packet) are called filters (or rules in firewall terminology), and the packet classification problem is to determine the lowest cost matching filter or rule for each incoming message at the router. The relevant information is contained in K distinct header fields in each message (packet). For instance, the relevant fields for an IPv4 packet could comprise the Destination Address (32 bits), the Source Address (32 bits), the Protocol Field (8 bits), the Destination Port (16 bits), the Source Port (16 bits), and, optionally, the TCP flags (8 bits). Since the number of flags is limited, the protocol and flags may be combined into one field in some implementations. Classification on these fields is commonly referred to as 5-tuple classification.

The filter database of a Layer-4 Switch consists of a finite set of filters, $filt_1, filt_2 \ldots filt_N$. Each filter is a combination of K values, one for each header field. Each field in a filter is allowed three kinds of matches: exact match, prefix match, or range match. In an exact match, the header field of the packet should exactly match the filter field. In a prefix match, the filter field should be a prefix of the header field. In a range match, the header values should like in the range specified by the filter. Each filter $filt_i$ has an associated directive $disp_i$, which specifies how to forward a packet matching the filter.

Since header processing for a packet may match multiple filters in the database, a cost is associated with each filter to determine the appropriate (best) filter to use in such cases. Accordingly, each filter F is associated with a cost(F), and the goal is to find the filter with the least cost matching the packet's header.

Once a packet is assigned to a flow, it is produced on a corresponding scratch ring. In further detail, N scratch rings 1 to N are configured in SHaC unit 616 during the initialization operations of block 400 above. An IXP2xxx NPU supports up to 16 scratchpad rings. As shown in the SHaC unit detail 626 at the bottom of FIG. 6, each ring is implemented as an array (of configurable size) in scratchpad memory, with pointers to the first and last entries on the ring, called the head and tail, respectively. The SHaC unit maintains the head and tail pointers, the base address, and the size (in long words) of each ring. The head and tail pointers are circular pointers that respectively correspond to the aforementioned consuming and producing pointers, and are modified during put (produce) and get (consume) commands on the ring to reflect the current position of the producing (tail) and consuming (head) pointers.

Initially, upon startup of the network element, all of the flow counters are set to zero. As packets are received, they are assigned to new or existing flows, with corresponding flow entries being looked up in a flow table 628. At the same time, the flows are associated with corresponding scratch rings, through some type of handle, such as a flow identifier (flow ID). The particular manner in which flow IDs are assigned to scratch rings is independent of the operation of the embodiments described herein. The important aspect here is that packets assigned to the same flow are processed on the same packet processing microengine (hence achieving a high probability of cache hit in the packet processing ME); the scratch ring schemes disclosed herein merely provide a convenient mechanism for effecting this result.

The number of flows assigned to a given scratch ring is generally configurable (e.g., configured in advance, or dynamically programmable). In general, this number will correspond to the number of flow-related entries that may be cached on a given packet processing microengine. For example, in one embodiment, this number is set to 16, which coincides with the number of CAM entries in an IXP2xxx NPU. However, this number is merely exemplary, as other numbers of entries may also be used. In one embodiment, flows are assigned to scratch rings based on their flow IDs, which are sequentially allocated. Accordingly, under one implementation, packet flows having flow IDs of 0-15 are assigned to scratch ring 1, 16-31 to scratch ring 2, and so on. Under another approach, flows may be assigned to scratch rings by performing a hash on the flow IDs. This is advantageous when the number of flows is large. Flows may also be dynamically allocated to scratch rings based on their relative consumption rate. For example, back-pressure mechanisms may be used to inform the PCMD microengine that a given packet processing microengine is starving or overloaded. Information identifying which flow ID is assigned to which scratch ring is stored in the PCMD microengine 302. In one embodiment, this information is stored in its local context register as a bit map in the PCMD microengine.

Other flow ID to scratch ring assignment schemes may also be used. For example, in another embodiment, once the scratch rings are full with a maximum cache limit, the PCMD can start assigning the new flow IDs in a round robin fashion to the scratch rings. In yet another embodiment, a priority-based assignment algorithm may be used. The algorithm(s) to be used for flow assignment is also independent of this embodiment.

Assigning a flow ID to a scratch ring that is already full might require replacing an existing assignment. Under one embodiment, a least recently used (LRU) flow ID is replaced. This may be facilitated, for example, using the microengine's CAM.

As discussed above with reference to blocks 510 and 512 of FIG. 5, as packets are produced on each of the scratch rings, they are also being consumed by associated packet processing microengines, which then perform subsequent packet processing operations using a functional pipeline. An example of a common packet processing operation comprising packet enqueueing is illustrated in FIG. 6.

During packet enqueueing, packets are copied from Rx buffers 618 (or possibly some other buffer) into a buffer (commonly referred to as a queue) in DRAM 608 allocated for the flow the packet is assigned to. For example, as shown in FIG. 6, this is facilitated by the use of three data structures: flow table 628, a queue descriptor array 630, and queues (as illustrated by a queue 632). Each flow table entry 634 includes a flow ID and a buffer pointer, as well as other optional information, such as depicted by a state field and a statistics field. The buffer pointer points to the location of the queue descriptor 636 corresponding to the flow table entry. In turn, the queue descriptor contains information that identifies the head of the queue (i.e., the DRAM address of the first packet in the queue, and the tail of the queue (the DRAM address at which the next packet corresponding to the flow is to be stored).

As further illustrated in FIG. 6, each of the packets in packet stream 622 is labeled to identify the flow it is associated with and the sequence number of the packet within the flow. For example, F1-1 identifies this packet is the first packet for a flow 1. (As will be understood by those skilled in the art, the actual packet will contain a packet header containing information used to classify the packet—information explicitly identifying the flow will not usually be provided by the packet, as least at the TCP or UDP header level.) As further illustrated in FIG. 6, the packets for flow 1 are stored in queue 632. Similarly, packets associated with other flows would be stored in other queues in DRAM 608, with corresponding flow table entries and queue descriptors identifying the locations (DRAM addresses) for those queues.

Subsequent to enqueueing the packets, the packets in a given queue will be copied into Tx buffers 620 and asynchronously transferred to an appropriate target destination for the flow, such as an output port of the network element or a switch fabric for the network element. These operations are generally handled via execution of other instruction threads on the microengines that are not shown in FIG. 6 for simplicity and clarity. In general, the enqueueing and dequeueing operations may be part of the same functional pipeline, or may be implemented via separate pipelines.

Now, let's consider some advantages of the illustrated approach. By assigning packet processing for packets associated with a common flow to the same packet processing microengine, information pertaining to such packet processing operations may be cached on the microengine, thus reducing the need to retrieve this information from SRAM 606, DRAM 608, or some other storage location. For instance, flow table entries corresponding to the flows that are processed by a given packet processing microengine may be stored on a local memory resource, such as local memory 202 or CAM 215. Thus, during the packet processing operation, there would be no need to access a lookup table entry for the flow each time a packet was consumed by a packet processing ME.

Typically, packet processing MEs perform a high amount of I/O or memory accesses for packet processing operations like IPv4 LPM, IPv6 Forwarding lookup, etc. Since data related to these packet processing operations for a given flow will have been previously accessed and cached during prior packet processing operations, by assigning the same ME to perform packet processing for a given set of flows, the likelihood of the packet processing data already being cached on that ME is significantly enhanced (in comparison with random assignment of packets to MEs used under conventional techniques) along with the probability of cache lookup hit. Hence, the flow-based packet to ME assignment techniques disclosed herein ensure that a high percentage of cached data usage results compared to classical methods.

FIG. 7 shows further details of network line card 602 and NPU 604. In general, network line card 602 is illustrative of various types of network system line cards employing standardized or proprietary architectures. For example, a typical line card of this type may comprise an Advanced Telecommunications and Computer Architecture (ATCA) modular printed circuit board (PCB) that is coupled to a common backplane in an ATCA chassis that may further include other ATCA modular boards. Accordingly the line card includes a set of connectors coupled to its PCB to mate with mating connectors on the backplane, as illustrated by a backplane interface 700. In general, backplane interface 700 supports communication via various input/output (I/O) communication channels, as well as provides power to network line card 602. For simplicity, only selected I/O interfaces are shown in FIG. 7, although it will be understood that other I/O and power input interfaces also exist.

The network line card employs a network processor unit (NPU) 604 that includes n compute engines (e.g., microengines 610) that execute sets of instruction threads to effect the operations described herein. In one embodiment, n=8, while in other embodiment n=16, 24, or 32. Other numbers of microengines 610 may also me used. In the illustrated embodiment, 16 microengines 610 are grouped into two clusters of 8 microengines, including an ME cluster 0 and an ME cluster 1 (the latter showing only 2 microengines for simplicity).

Each of microengines 610 is connected to other NPU components via sets of bus and control lines referred to as the processor "chassis". For simplicity and clarity, these bus sets and control lines are depicted as an internal interconnect 704. Also connected to the internal interconnect are an SRAM interface unit 612, a DRAM interface unit 614, a general purpose processor 706, a media and switch fabric interface 708, a PCI (peripheral component interconnect) controller 710, and an SHaC unit 616. Other components not shown that may be provided by network processor 604 include, but are not limited to, encryption units and a performance monitor.

The SRAM interface unit 612 is used to access an external SRAM store 606 via an SRAM interface 712. Similarly, DRAM interface unit 614 is used to access an external DRAM store 608 via a DRAM interface 714. In one embodiment, SRAM interface 712 comprises a multi-channel interface and SRAM store comprises a quad data rate (QDR) SRAM. In one embodiment, DRAM store 608 employs DDR (double data rate) DRAM. In other embodiment DRAM store may employ Rambus DRAM (RDRAM) or reduced-latency DRAM (RLDRAM). Other types of memories may also be employed for each of the SRAM and DRAM stores.

Media and switch fabric interface 708 is used to interface with the media switch fabric for the network element in which the line card is installed. In one embodiment, media and switch fabric interface 708 employs a System Packet Level Interface 4 Phase 2 (SPI4-2) interface 716. In general, the actual switch fabric may be hosted by one or more separate line cards, or may be built into the chassis backplane. Both of these configurations are illustrated by switch fabric 718 in FIG. 7.

PCI controller 710 enables NPU 604 to interface with one or more PCI devices that are coupled to backplane interface 700 via a PCI interface 720. In one embodiment, PCI interface 720 comprises a PCI Express interface.

Packet processing services corresponding to one or more applications hosted by the network system are implemented via execution of corresponding software components on MEs 610 and general-purpose processor 706. Typically, the code for a given application comprises sets of instruction threads that are executed on selected MEs using a coordinated approach, such as discussed above for the context pipelining and function pipelining schemes. Fast path operations (operations relating to packet-processing at line-rate speeds, also referred to a data-plane operations) are generally implemented via execution of corresponding service threads on the MEs. Meanwhile, slow path operations (operations performed on packets that cannot meet line-rate speed requirements) and control plane operations are generally implemented via execution of instructions on general-purpose processor 706.

During initialization of network line card 602, a first portion of coded instructions (e.g., microcode) to facilitate various packet-processing functions and operations are loaded into the control stores 212 of MEs 610. This includes instructions corresponding to a PCMD module 722, which is loaded into the control store for one or mode selected MEs. Similarly, a second portion of the instructions is loaded into DRAM 608 for execution on general-purpose processor 706, including instructions comprising control plane PCMD initialization module 300. In one embodiment, the instructions are loaded from a non-volatile store 724 hosted by network line card 602, such as a flash memory device. Other examples of non-volatile stores include read-only memories (ROMs), programmable ROMs (PROMs), and electronically erasable PROMs (EEPROMs). In one embodiment, non-volatile store 724 is accessed by general-purpose processor 706 via an interface 726. In another embodiment, non-volatile store 724 may be accessed via an interface (not shown) coupled to internal interconnect 704.

In addition to loading the instructions from a local (to line card 602) store, instructions may be loaded from an external source. For example, in one embodiment, the instructions are stored on a disk drive 726 hosted by another line card (not shown) or otherwise provided by the network system in which line card 602 is installed. In yet another embodiment, the instructions are downloaded from a remote server or the like via a network 728 as a carrier wave.

As discussed throughout, various operations and functions corresponding to aspects of the embodiments of the invention discussed herein are implemented via execution of coded instructions. Thus, embodiment of the invention may comprise software embodied as sets of instructions executed on some form of processing core or otherwise implemented or realized upon or within a machine-readable medium. A machine-readable medium includes any mechanism for storing information in a form readable by a machine (e.g., a computer). For example, a machine-readable medium can include an article of manufacture such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    performing packet processing operations on a network processor having multiple compute engines via execution of instruction threads on those compute engines;
    implementing a flow-based packet processing assignment mechanism that causes at least a portion of the packet processing operations for packets associated with common flows to be performed on compute engines assigned to perform packet processing operations for those flows;
    assigning flows of packets to scratch rings;
    assigning, for each scratch ring, at least one compute engine to consume packets from that scratch ring;
    classifying received packets into the flows based on attributes of those packets; and
    for a given packet of a given flow:
        producing the packet on the scratch ring to which the given flow is assigned; and
        performing the portion of the packet processing operations on the at least one compute engine assigned to the scratch ring;
    maintaining respective flow counters for the scratch rings, each flow counter identifying how many flows have been assigned to its associated scratch ring;
    determining a number of flows assigned to a given scratch ring has reached a predefined limit; and
    replacing one of the flows assigned to that scratch ring with a new flow, the flow that is replaced comprising a least recently used flow.

2. The method of claim 1, wherein the performing the portion of the packet processing operations comprises:
    performing packet processing on a compute engine assigned to perform packet processing operations for a given flow using functional pipelining, wherein a plurality of packet processing functions are performed on the compute engine.

3. The method of claim 1, further comprising:
    identifying a new flow;
    generating a new flow identifier (ID); and
    associating the new flow ID with a scratch ring.

4. The method of claim 3, further comprising:
    caching information corresponding to a given flow on a compute engine assigned to perform packet processing operations for packets associated with the flow.

5. The method of claim 3, further comprising:
    caching the information corresponding to the given flow in a content addressable memory (CAM) for the compute engine.

6. The method of claim 1, further comprising:
    determining that all scratch rings have been assigned a full allotment of flows; and
    assigning a new flow to a scratch ring using a round robin scheme to determine to which scratch ring to assign the new flow.

7. The method of claim 1, further comprising:

determining that all scratch rings have been assigned a full allotment of flows; and employing a priority-based scheme to determine to which scratch ring to assign a new flow.

8. A network line card, comprising:

a printed circuit board (PCB) including a backplane interface;

a network processor unit, mounted on the PCB operatively coupled to the backplane interface and including, an internal interconnect comprising a plurality of command and data buses;

a plurality of multi-threaded compute engines communicatively-coupled to the internal interconnect;

scratchpad memory, communicatively-coupled to the internal interconnect; and a general-purpose processor communicatively-coupled to the internal interconnect; and a storage device, having coded instructions stored therein to execute on at least one of the plurality of compute engines and the general-purpose processor to perform operations comprising:

initializing scratch rings in the scratchpad memory;

initializing at least a portion of the compute engines to consume packets from associated scratch rings, each compute engine assigned to consume packets from a scratch ring to which it is associated;

identifying new flows corresponding to packets received at the network line card based on attributes of those packets;

assigning the new flows to the scratch rings;

classifying the received packets into flows based on the packet attributes;

for a given packet assigned to a given flow, producing the packet on the scratch ring to which the given flow is assigned;

consuming packets from each scratch ring using at least one compute engine assigned to that scratch ring; and performing the at least a portion of the packet processing operations on a compute engine that consumed the packet.

9. The network line card of claim 8, wherein the network processor unit comprises an Intel IXP 2xxx NPU.

10. The network line card of claim 8, wherein a compute engine includes a content addressable memory (CAM), and execution of the instruction performs further operations comprising:

caching information corresponding to a given flow on a compute engine assigned to perform packet processing operations for packets associated with the flow, the information being cached in the CAM of the compute engine.

11. The network line card of claim 8, wherein execution of the instruction performs further operations comprising:

maintaining respective flow counters for the scratch rings, each flow counter identifying how many flows have been assigned to its associated scratch ring.

* * * * *